Aug. 22, 1961　　　T. E. STRETTON ET AL　　　2,997,508
CHLORINATION PROCESS
Filed Sept. 17, 1958　　　　　　　　　　　　2 Sheets-Sheet 1
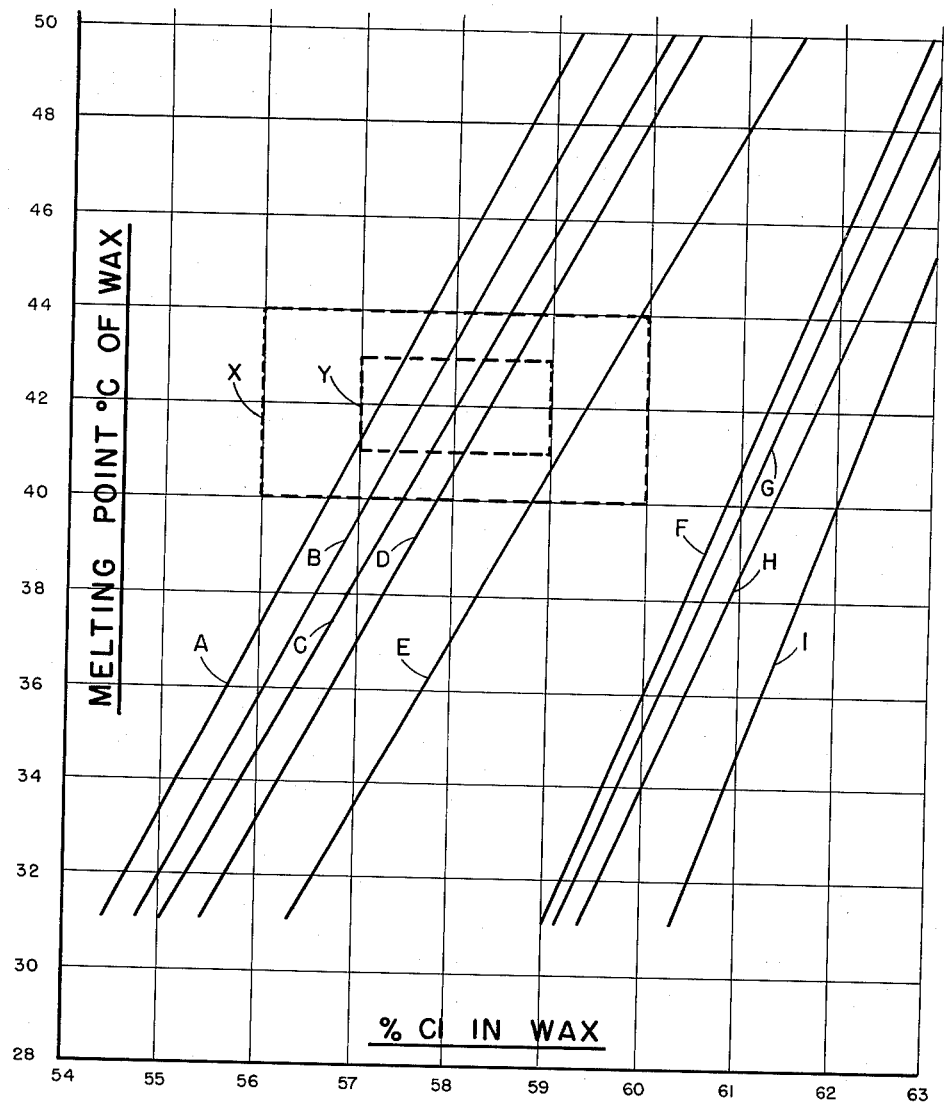
FIG. I
THOMAS E. STRETTON
FRANKLYN D. MILLER
*INVENTORS*
BY Lawrence Rosen
ATTORNEY Aug. 22, 1961     T. E. STRETTON ET AL     2,997,508
CHLORINATION PROCESS
Filed Sept. 17, 1958     2 Sheets-Sheet 2
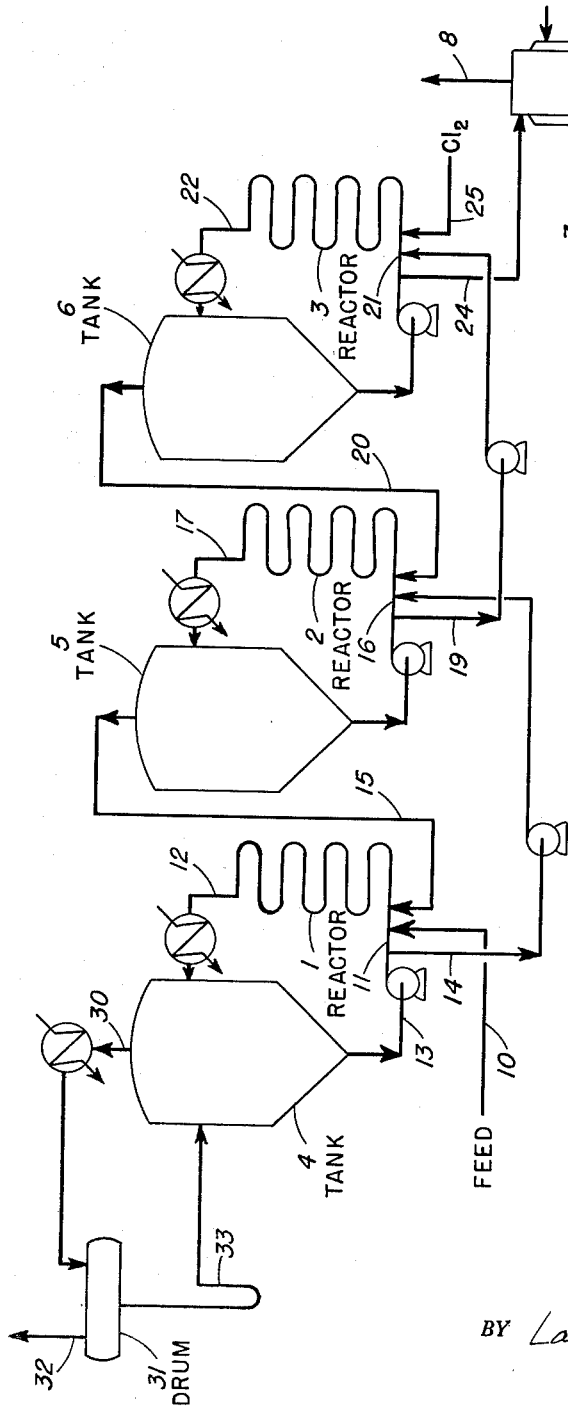
FIG. II
THOMAS E. STRETTON
FRANKLYN D. MILLER
*INVENTORS*
BY Lawrence Rosen
ATTORNEY 3,997,508
CHLORINATION PROCESS
Thomas E. Stretton, Pearl River, N.Y., and Franklin D. Miller, Cincinnati, Ohio, assignors to National Distillers and Chemical Corporation, New York, N.Y., a corporation of Virginia
Filed Sept. 17, 1958, Ser. No. 761,573
6 Claims. (Cl. 260—660)

This invention relates to a process of chlorinating waxes and the chlorinated products derived therefrom. More particularly, the invention pertains to a chlorination process wherein mixtures of soft wax and oil are highly chlorinated to obtain stable compositions having high melting points.

This application is a continuation-in-part of Serial Number 621,847, filed November 13, 1956, now U.S. Patent No. 2,916,428.

A large number of processes for the chlorination of paraffin waxes have been disclosed in the art. When producing a high melting point product, these processes have generally comprised chlorinating a refined paraffin wax with gaseous chlorine in the presence of a volatile solvent under well established temperature and pressure conditions. Actinic light and various chemical catalysts have often been employed to promate the chlorination reaction. The conventional chlorination methods, however, have not been able to effectively utilize a soft wax to produce a highly chlorinated product having a high melting point, stability and a white or substantially colorless appearance. It has been found, for example, that when high molecular weight hydrocarbons such as waxes are chlorinated severe stability problems and undesirable colors are encountered at elevated temperatures. One object of the invention is the preparation of chlorinated wax compositions having the properties outlined above. Another object of this invention is to prepare such chlorinated wax compositions in the absence of solvents which have to be subsequently separated from the reaction products. Other objects of the invention will become apparent from the following description.

In accordance with the present invention, it has now been found that a chlorinated wax product having a high chlorine content as well as the desired melting point, stability, and color properties, may be prepared by chlorinating a wax-oil feed mixture comprising a major proportion of a soft paraffin wax and a minor proportion of a hydrocarbon oil. The chlorinated waxes prepared by the process of the invention may be employed in many of the conventional chlorinated wax applications. These chlorinated waxes may, for example, be used for imparting water and fire resistance to various materials. A particularly outstanding use of the chlorinated waxes of the invention is in the preparation of mastic tiles having excellent oil resistance, grease resistance and hardness characteristics. More specifically, it has been found that a chlorinated wax prepared according to the process of this invention and having a chlorine content within the range of about 56 to 60%, preferably about 57 to 59%, and a melting point of about 40° to 44° C., preferably about 41° to 43° C., is especially useful in the preparation of mastic floor and wall tiles.

In general, the wax feed mixtures useful for the purposes of the invention comprise about 55 to 80%, preferably about 60 to 75% by wt. of a soft paraffin wax and about 20 to 45% preferably about 25 to 40% by weight of a normally liquid paraffinic hydrocarbon oil. The paraffin wax is preferably a soft or slop wax having an ASTM melting point of about 37° to 47° C., an API gravity of about 42 to 46, an ASTM penetration of at least 317 and a molecular weight of about 280 to 400. The hydrocarbon oil may comprise straight or branched chain aliphatic hydrocarbons or mixtures thereof having a molecular weight within the range of about 280 to 400, a viscosity index of about 95 to 105, a viscosity of about 105 SSU at 100° F., and 40 SSU at 210° F., and an API gravity of about 30 to 34. Preferably, the hydrocarbon oil employed will have an average molecular weight at least equal to the molecular weight of the wax. Both the wax and the hydrocarbon oil may be derived from various paraffinic or mixed base petroleum crudes by conventional refining methods used in the production of refined waxes and lubricating oil base stocks.

It also has been found that a minor proportion of a solvent may be advantageously employed in conjunction with the foregoing wax and hydrocarbon oil materials to make up the the wax feed mixture. Though the theory is not entirely understood, the use of the solvent appears to minimize the foaming difficulties which are sometimes encountered in the chlorination of paraffin waxes. The solvent employed must be of such a nature that its separation from the other chlorination products is not necessary. The solvent will generally comprise a mixture of highly branched chain saturated hydrocarbons having eleven or more carbon atoms, preferably about $C_{11}$ to $C_{14}$, with a boiling point within the range of about 176° to 260° C., and an average molecular weight of about 160 to 190. A particularly effective solvent is the heavy ends obtained from the reaction of butylene with isobutane as is done in the preparation of alkylate to be used for gasoline blending. This solvent has the following specification:

| | |
|---|---|
| Boiling point | 190°–240° C., 50% 204° C. |
| Aniline point | 84–92 |
| Flash point | 140° F. |
| Specific gravity | 0.7682 |
| Average molecular wt | 180 |
| Constituents: | |
| Olefins | 5.7% |
| Saturates | 83.0% |
| Naphthenes | 11.3% |

When the solvent is employed the feed mixture will comprise about 50 to 75%, preferably about 57 to 65%, by weight of the soft wax; about 20 to 35%, preferably about 28 to 31%, by weight of the hydrocarbon oil; and about 2 to 25%, preferably about 5 to 15%, by weight of the solvent.

The soft wax-oil feed mixture of the invention with or without the use of the aforesaid solvent may be chlorinated by conventional means. It is preferred, however, that the chlorination be carried out by passing gaseous chlorine through the wax mixture at a reaction temperature of about 212° to 230° F. and under superatmospheric pressure, e.g. about 10 to 100 p.s.i.g. in the presence or absence of actinic light or chemical catalysts. Chlorination may be continued until the desired chlorine content has been achieved. Time periods within the range of about 10 to 40 hours are usually sufficient for the purposes of the present invention. Either batch or continuous operations may be employed. It is, for example, within the scope of this invention to utilize a series of two to four or more chlorination reactors with a continuous countercurrent flow of the gaseous chlorine and wax feed mixture. The series of chlorination reactors may also be operated batch-wise with the fresh chlorine gas being first passed into the end reactor and then to each of the preceeding reactors.

Usually, the chlorinated wax prepared in accordance with this invention will be blown with air or nitrogen to remove free chlorine and hydrogen chloride. It will be understood that minor amounts of conventional stabilizers may be incorporated in the finished chlorinated wax composition. Such stabilizers may, for example, include various inorganic and organic compounds known to the art. Illustrative stabilizers include: glycols such as ethylene glycol and propylene glycol, polymers of epoxy-alkyl alkenyl ethers, tin hydrocarbons such as tetrabutyl tin, iron salts such as iron chloride and iron sulfate, etc.

If actinic light is employed for promoting the chlorination reaction any of the well known commercial light sources, which will induce or speed the chlorination of waxes, may be used such as tungsten filament lamps, ultraviolet lamps, mercury vapor arc lamps, fluorescent lamps, ordinary light bulbs, and the like.

The invention will be further understood by reference to the following examples:

EXAMPLE I

A number of wax feed mixtures, as listed below in the table, were chlorinated as follows:

The wax feed mixture was subjected to chlorination in a four step batch operation. The fresh feed wax mixture was fed to the first chlorination reactor, and then successively to each of the three remaining chlorination reactors. Fresh gaseous chlorine was fed directly to the fourth reactor in the series and then successively to each of the preceding reactors. Consequently, the fresh feed wax was contacted with a gaseous mixture comprising chlorine and hydrogen chloride. The degree of chlorination was increased as the wax feed mixture was passed from the first through the fourth chlorination reactor. A temperature of about 105° C. and a pressure not exceeding 50 p.s.i.g. was maintained in each of the chlorination reactors. The time period required to chlorinate the feed material varied from 10 to 15 hours. The chlorinated wax recovered from the fourth chlorination vessel was air blown at a temperature of about 105° C. to remove residual chlorine and hydrogen chloride.

The composition of the wax feed mixtures and the characteristics of the finished chlorinated wax products is tabulated below:

*Table A*

| Run | Wax Feed Mixture | | Wt. Percent Solvent [3] | Chlorinated Wax | |
|---|---|---|---|---|---|
| | Wt. Percent Wax [1] | Wt. Percent Oil [2] | | Percent Cl | M.P., °C. |
| 1 | 60.0 | 40.0 | | 59 | 49 |
| 2 | 60.0 | 40.0 | | 58 | 45 |
| 3 | 60.0 | 40.0 | | 57 | 41 |
| 4 | 60.0 | 40.0 | | 56.5 | 39 |
| 5 | 60.0 | 40.0 | | 56 | 37 |
| 6 | 65.0 | 35.0 | | 59 | 47 |
| 7 | 65.0 | 35.0 | | 58 | 43.3 |
| 8 | 65.0 | 35.0 | | 57 | 39.5 |
| 9 | 65.0 | 35.0 | | 56 | 35.8 |
| 10 | 63.7 | 31.3 | 5.0 | 60 | 49.3 |
| 11 | 63.7 | 31.3 | 5.0 | 59 | 45.5 |
| 12 | 63.7 | 31.3 | 5.0 | 58 | 42 |
| 13 | 63.7 | 31.3 | 5.0 | 57.5 | 40 |
| 14 | 63.7 | 31.3 | 5.0 | 57 | 38.3 |
| 15 | 72.3 | 27.7 | | 59 | 44.4 |
| 16 | 72.3 | 27.7 | | 58.5 | 42.5 |
| 17 | 72.3 | 27.7 | | 58 | 41.2 |
| 18 | 72.3 | 27.7 | | 57.5 | 38.8 |
| 19 | 72.3 | 27.7 | | 57 | 37 |
| 20 | 57.0 | 28.0 | 15.0 | 60 | 44.2 |
| 21 | 57.0 | 28.0 | 15.0 | 59.5 | 42.5 |
| 22 | 57.0 | 28.0 | 15.0 | 59 | 40.7 |
| 23 | 57.0 | 28.0 | 15.0 | 58.5 | 38.9 |
| 24 | 57.0 | 28.0 | 15.0 | 57 | 33.5 |
| 25 | 87.0 | 13.0 | | 62 | 47.8 |
| 26 | 87.0 | 13.0 | | 61 | 40.5 |
| 27 | 87.0 | 13.0 | | 60.5 | 38.1 |
| 28 | 87.0 | 13.0 | | 60 | 35.7 |
| 29 | 82.6 | 12.4 | 5.0 | 62 | 49.7 |
| 30 | 82.6 | 12.4 | 5.0 | 61 | 40 |
| 31 | 82.6 | 12.4 | 5.0 | 60.5 | 36.3 |
| 32 | 82.6 | 12.4 | 5.0 | 60 | 35.2 |
| 33 | 74.0 | 11.0 | 15.0 | 62 | 43.1 |
| 34 | 74.0 | 11.0 | 15.0 | 61 | 38.5 |
| 35 | 74.0 | 11.0 | 15.0 | 60.5 | 36.3 |
| 36 | 74.0 | 11.0 | 15.0 | 62 | 34 |
| 37 | 65.2 | 9.8 | 25.0 | 61 | 40 |
| 38 | 65.2 | 9.8 | 25.0 | 60.5 | 34.9 |
| 39 | 65.2 | 9.8 | 25.0 | 60.5 | 32 |

[1] In runs 1 to 24 the wax has the following specification: A melting point of 104.0° F. and an API gravity of 44.1. In runs 25 to 39 the wax has the following specification: A melting point of 116.6° F. and an API gravity of 41.1.

[2] The hydrocarbon oil employed had the following specification: A flash point of 380° F., 95 V.I., and a viscosity of 65 SUS 130° F.

[3] The solvent is one described in column 2 of the specification.

In the accompanying graph, in FIG. I, percentage chlorine is plotted against melting point data obtained from the chlorinated wax properties tabulated above. The relationship between the plotted curves and the runs is as follows:

| Curve: | Runs |
|---|---|
| A | 1 to 5 |
| B | 6 to 9 |
| C | 10 to 14 |
| D | 15 to 19 |
| E | 20 to 24 |
| F | 25 to 28 |
| G | 29 to 32 |
| H | 33 to 36 |
| I | 37 to 39 |

The rectangular area defined by dotted line X sets the bounds within which the properties of the desired chlorinated wax composition fall, i.e. a melting point of about 40° to 44° C. and a chlorine content of about 56 to 60%. Dotted line Y, on the other hand, sets the bounds of the preferred properties, i.e. a melting point of about 41° to 43° C., and a chlorine content of about 57 to 59%. The above data, as graphically illustrated, show that a wax feed mixture comprising about 55 to 80%, preferably about 60 to 75%, soft wax and about 20 to 45%, preferably about 25 to 40%, hydrocarbon oil must be employed in order to obtain the desired melting point and chlorine content. The above data also shows that a hydrocarbon solvent may also be successfully employed in conjunction with the wax and the hydrocarbon oil provided that the amount of hydrocarbon oil employed does not constitute less than about 20% by wt. of the wax feed mixture. The desired chlorinated wax compositions prepared by the method outlined above have a density ranging from about 1.290 to 1.350.

In accordance with another aspect of this invention, a novel process has been found for effecting the high percentage chlorination of the soft wax-hydrocarbon oil mixtures described above. The process, as hereinafter described in detail, has a number of important advantages including substantially complete utilization of the chlorine and the avoidance of the troublesome foaming problem which exists in the prior art processes. In addition, the process is preferably carried out in equipment constructed of carbon steel, whereas it is common practice in the industry to use expensive nickel or glass lined equipment. It also has been found that the chlorination reaction is speeded up and that continuous operations are readily attained. These advantages are achieved, in general, by successively passing the reaction mixture being chlorinated through a number of successive stages, each stage comprising a reaction zone and a disengaging zone, the latter being maintained at a lower pressure than the reaction zone.

For a more complete understanding of this invention, reference will now be made to FIG. II of the drawings, which is a schematic showing of one form of apparatus wherein the process may be carried out. It will be readily apparent, however, that this particular modification is subject to modifications without departing from the scope of this invention.

With particular reference to FIG. II there is shown a three stage operation comprising three combined reactor and disengaging tank units so positioned that the material being chlorinated will flow to each succeeding stage in a direction countercurrent to the flow of the chlorinating gas. It should be noted, however, that in each reactor a concurrent flow of material and chlorinating gas takes place.

In an actual operation, after a typical start up, a feed material, having the composition described in Run No. 12 in the table in column 3, is passed at a rate of about 2.23 gallons per minute via line 10 into line 11 where it contacts a chlorine-containing gas (about 26 vol. percent) passed to line 11 via line 15. The resulting mixture is pumped via line 11 to reactor at a pressure of about 45 p.s.i.g. The temperature in the reactor will be about 123° C. The chlorinated mixture is continuously passed via line 12 from reactor 1 into disengaging tank 4, which is operated at a pressure of about 25 p.s.i.g. and a temperature of about 120° C. Under these conditions the unreacted chlorine gas and gaseous hydrogen chloride by-product are disengaged from the chlorinated reaction mixture and passed via line 30 to a cooler and then to knock out drum 31 where any hydrocarbon material is removed from the gases and recycled to disengaging tank 4 via line 33. The off gases comprising anhydrous hydrogen chloride and about 2 to 3 vol. percent chlorine are removed from drum 31 via line 32; and they may be further treated, if desired, to recover the chlorine therefrom. It will be understood, that in actual operations of Stage 1, the mixture undergoing chlorination will be constantly circulated between the reactor and the disengaging tank via lines 11, 12 and 13 at a rate of about 312 gallons per minute. The hold up of the reaction mixture in tank 4 is about 1120 gallons. The chlorinated wax mixture, containing about 22% by weight of chlorine, is continuously contacted with chlorine-containing gas fed into line 11 via line 15 and with fresh feed fed into line 11 via line 10. A portion of the chlorinated wax mixture is continuously withdrawn via line 14 and pumped at a rate of 2.57 gallons per minute into Stage 2 at line 16, which is also supplied with a chlorine-containing gas (about 63.4% by volume of chlorine) via line 20. The resulting reaction mixture is passed via line 16 to reactor 2 which is operated at a pressure of about 65 p.s.i.g. and at a temperature of about 122° C. The reaction mixture passes from reactor 2 via line 17 to tank 5 having a hold up capacity of about 1270 gallons of chlorinated wax mixture and which is operated at a temperature of about 120° C. and a pressure of about 45 p.s.i.g. The chlorinated wax mixture is circulated between the disengaging tank and the reactor at a rate of about 625 gallons per minute. The degree of chlorination reached in this stage of the process is about 45% by weight of the wax mixture. A portion of the circulating chlorinated wax mixture is continuously withdrawn at a rate of 2.75 gallons per minute from ilne 16 via line 19, located at a point on line 16 prior to feed lines 14 and 20. In tank 5 the chlorine and hydrogen chloride gases are disengaged from the chlorinated wax mixture and passed via line 15 to line 11, as previously described.

The chlorinated wax mixture in line 19 is passed to line 21, at a rate of about 2.75 gallons per minute, where it contacts fresh chlorine gas entering via line 25. The resulting mixture is pumped to reactor 3, which is operated at a pressure of about 105 p.s.i.g. and a temperature of about 122° C. The reaction mixture is passed from reactor 3 via line 22 into tank 6, operated with a hold up capacity of 1412 gallons and at a pressure of about 65 p.s.i.g. and a temperature of 120° C. In tank 6 the chlorine and hydrochloric acid gases are disengaged from the chlorinated wax mixture and passed via line 20 into line 16, as set forth above. The chlorinated wax mixture is circulated between reactor 3 and tank 6 at about 625 gallons per minute to achieve about a 58% chlorine content. About 3.21 gallons per minute of the chlorinated wax mixture is continuously withdrawn from Stage 3 from line 21 via line 24 and passed to jacketed heated separator 7 which is operated at atmospheric pressure and about 104° C. If desired, two or more such separators may be employed in series in order to bring the chlorinated wax mixture to atmospheric pressure in a stagewise manner. In separator 7 the chlorine-containing gas disengaged from the wax mixture is vented in line 8, and it may be recycled (not shown) to Stages 1 or 2 of the process to aid in achieving the desired degree of chlorination. The chlorinated wax having a chlorine content of about 58% by weight is withdrawn from separator 7 via line 9 and may be stored or directly employed for the purposes previously enumerated.

It will be apparent from the foregoing description that a continuous process has been provided for achieving a high degree of chlorination of various wax mixtures. Though the process specifically disclosed above is particularly useful for chlorinating the wax mixture previously described, it is obvious that the process may be also employed for chlorinating other relatively high molecular weight, liquid or solid hydrocarbons, having at least 6 carbon atoms per molecule, such as heavy alkylates, kerosene, lube oil distillates, crystalline and amorphous waxes, etc. The use of a soft paraffin wax in conjunction with a hydrocarbon oil having a molecular weight of about 280 to 400 and mixtures thereof with a hydrocarbon solvent having a molecular weight of about 160 to 190, as set forth in Example I, are the preferred feed materials for the foregoing process.

As shown above, the process of this invention also results in the production of anhydrous hydrogen chloride, which is a valuable by-product having numerous commercial applications. The recovery of anhydrous hydrogen chloride obviously is a significant factor in the economic and commercial aspects of this process.

The apparatus shown in FIG. II are illustrative only of various devices which can be employed for carrying out the chlorination process of this invention. It will also be understood that the pumps and cooler disclosed therein are conventional. Moreover, the disengaging tanks may be varied in size provided only that they are capable of maintaining the desired hold up of reaction mixture and permit the ready separation of the chlorine and hydrogen chloride gases from the fluid material. As illustrated in the drawing, the preferred reactors are bent pipes to en sure good dispersion of the chlorine gas in the reaction mixture. The pipes, as well as the other equipment, used, may be made of any material provided that it is resistant to chlorine and hydrogen chloride. Glass, for example, may be used to permit the material within the pipes to be activated by actinic light. However, it is another important advantage of the present process that actinic light, conventional in many prior art processes, need not be employed in order to accomplish the high degree of chlorination. The exact number of bends in the reactor pipes may also vary so long as efficient dispersion of the chlorine gas in the reaction mixture is achieved.

As previously disclosed, the temperatures in each stage of the process will be substantially the same. In general, the temperature will range from about 50° to 140° C., preferably 115° to 125° C. The pressures in the disengaging tank and reactor in each stage will differ as set forth below:

|  | Disengaging Tank, p.s.i.g. | Reactor, p.s.i.g. |
| --- | --- | --- |
| Stage 1 | 15 to 25 | 35 to 55 |
| Stage 2 | 35 to 55 | 55 to 75 |
| Stage 3 | 55 to 75 | 85 to 105 |

In order to ensure the countercurrent flow of reaction mixture and chlorine-containing gas with a minimum number of pumps, the pressure in each successive disengaging tank will be greater than the pressure in the preceding tank and not less than the pressure in the line into which the chlorine-containing gas separated from the disengaging tank is fed.

Though the use of a minimum of three stages, as shown in FIG. II, is preferred for chlorinating the soft paraffin wax feed material of this invention, two or more than three stages may be utilized depending upon such factors as the nature of the feed material, the degree of chlorination to be achieved and the particular commercial economies desired. In any event, each stage will contain a reactor and a disengaging tank with means for circulating the material between the two at rate sufficient to accomplish the maximum amount of chlorination at the temperatures and pressures employed.

It is another important advantage of the process of this invention, that the conventional method of removing the heat of reaction from the material undergoing halogenation by providing jacketed reaction vessels need not be employed. The prior art system, limited by the amount of heat which can be removed through the jacketed wall, would be inefficient in the instant process because the low film coefficient of the viscous chlorinated wax would result in a very poor heat transfer. By pumping the reaction mixture, including chlorine-containing gases, through external heat exchanger, as utilized in this process, overheating and decomposition of the wax mixture is effectively avoided. High production rates are also achieved.

It will be understood that the invention is not necessarily limited by the reactants and the operating conditions employed in the foregoing examples. The reactants and operating conditions may be varied within the limits indicated in the general portions of the specification.

What is claimed is:

1. A process for chlorinating a hydrocarbon mixture containing a soft paraffin wax and a hydrocarbon oil which comprises in an initial stage contacting said hydrocarbon mixture with a chlorine-containing gas, passing the resulting mixture at an elevated pressure through a reaction zone, passing the resulting reaction product mixture to a disengaging zone operated at an elevated pressure but at a pressure lower than in said reaction zone wherein by-product hydrogen chloride and unreacted chlorine gases are separated from the chlorinated hydrocarbon mixture, separately recovering said gases and said chlorinated hydrocarbon mixture, and continuously passing said chlorinated hydrocarbon mixture back to said reaction zone, along with additional chlorine-containing gas obtained from the succeeding reaction stage, continuing the sequential operations of reaction, disengaging and recycling, withdrawing at least a portion of the chlorinated hydrocarbon mixture from this stage of the process, passing said withdrawn chlorinated hydrocarbon mixture to at least one other succeeding stage containing a separate reaction zone and disengaging zone, said reaction zone having a pressure greater than the pressure in said reaction zone of the preceding stage and said disengaging zone having a pressure no less than the pressure in the reaction zone of the preceding stage, continuing the sequential operation of reaction, disengaging and recycling in the succeeding stage while passing chlorinated hydrocarbon mixture recovered from said preceding stage and chlorine gas obtained from a succeeding reaction stage into said stage, substantially fresh chlorine gas being added to the last succeeding stage passing said chlorine and hydrogen chloride gases recovered from the disengaging zone to the reaction zone of the preceding stage, obtaining from said succeeding stage a chlorinated hydrocarbon mixture having a higher chlorine content than the chlorinated hydrocarbon mixture withdrawn from the preceding stage, and recovering from the last succeeding stage said chlorinated hydrocarbon mixture.

2. The process of claim 1 wherein the temperature in each stage is about 50° to 140° C.

3. The process of claim 1 wherein there are at least three stages.

4. A continuous process for chlorinating a hydrocarbon mixture containing a soft paraffin wax and a hydrocarbon oil which comprises: in Stage 1 contacting said hydrocarbon mixture with a chlorine-containing gas, passing the resulting reaction mixture through a reaction zone at a pressure of about 35 to 55 p.s.i.g. and then to a disengaging zone having a pressure of about 15 to 25 p.s.i.g. wherein by-product anhydrous hydrogen chloride gas is separated from the resulting partially chlorinated hydrocarbon mixture, passing said partially chlorinated hydrocarbon mixture along with additional chlorine-containing gas back to said reaction zone, continuing said sequential operations of reaction, disengaging and recycling while continuously feeding fresh hydrocarbon mixture and additional chlorine-containing gas obtained from Stage 2 to Stage 1, and continuously withdrawing from Stage 1 a portion of said partially chlorinated hydrocarbon mixture after passage through said disengaging zone; in Stage 2, contacting said withdrawn partially chlorinated hydrocarbon mixture with a chlorine-containing gas obtained from Stage 3, passing the resulting reaction mixture through a reaction zone at a pressure of about 55 to 75 p.s.i.g. and then to a disengaging zone having a pressure of about 35 to 55 p.s.i.g. wherein chlorine and by-product hydrogen chloride gases are separated from the chlorinated hydrocarbon mixture, passing said separated gases to Stage 1, as said chlorine-containing gas, continuously passing said chlorinated hydrocarbon mixture along with additional chlorine-containing gas back to said reaction zone and continuing said sequential operation of reaction, disengaging and recycling while continuously feeding partially chlorinated hydrocarbon mixture from Stage 1 and chlorine-containing gas obtained from Stage 3, into Stage 2, and continuously withdrawing from Stage 2, a portion of said chlorinated hydrocarbon mixture after passage through said disengaging zone; and in Stage 3, contacting said withdrawn chlorinated hydrocarbon mixture from Stage 2 with a substantially fresh chlorine-containing gas, passing the resulting reaction mixture through a reaction zone at a pressure of about 85 to 105 p.s.i.g. and then to a disengaging zone having a pressure of about 55 to 75 p.s.i.g. wherein chlorine and by-product hydrogen chloride gases are separated from the chlorinated hydrocarbon mixture, passing said separated gases to Stage 2 as said chlorine-containing gas, continuously passing said chlorinated hydrocarbon mixture recovered from said disengaging zone back to said reaction zone along with substantially fresh chlorine-containing gas and continuing said sequential operations of reaction, disengaging and recycling while continuously feeding the chlorinated hydrocarbon mixture withdrawn from Stage 2 and substantially fresh chlorine-containing gas into Stage 3, and continuously withdrawing from Stage 3 a portion of said chlorinated hydrocarbon mixture, having a higher percentage of chlorine than the hydrocarbon mixtures withdrawn from Stages 1 and 2, after passage through said disengaging zone.

5. The process of claim 4 wherein said hydrocarbon mixture comprises about 60 to 75 wt. percent of a soft paraffin wax and about 25 to 40 wt. percent of a hydrocarbon oil.

6. The process of claim 4 wherein each stage is operated at a temperature of about 115° to 125° C.

References Cited in the file of this patent

UNITED STATES PATENTS

| | | |
|---|---|---|
| 1,432,761 | Koch | Oct. 24, 1922 |
| 2,746,999 | Gunkler et al. | May 22, 1956 |